Figure 7:
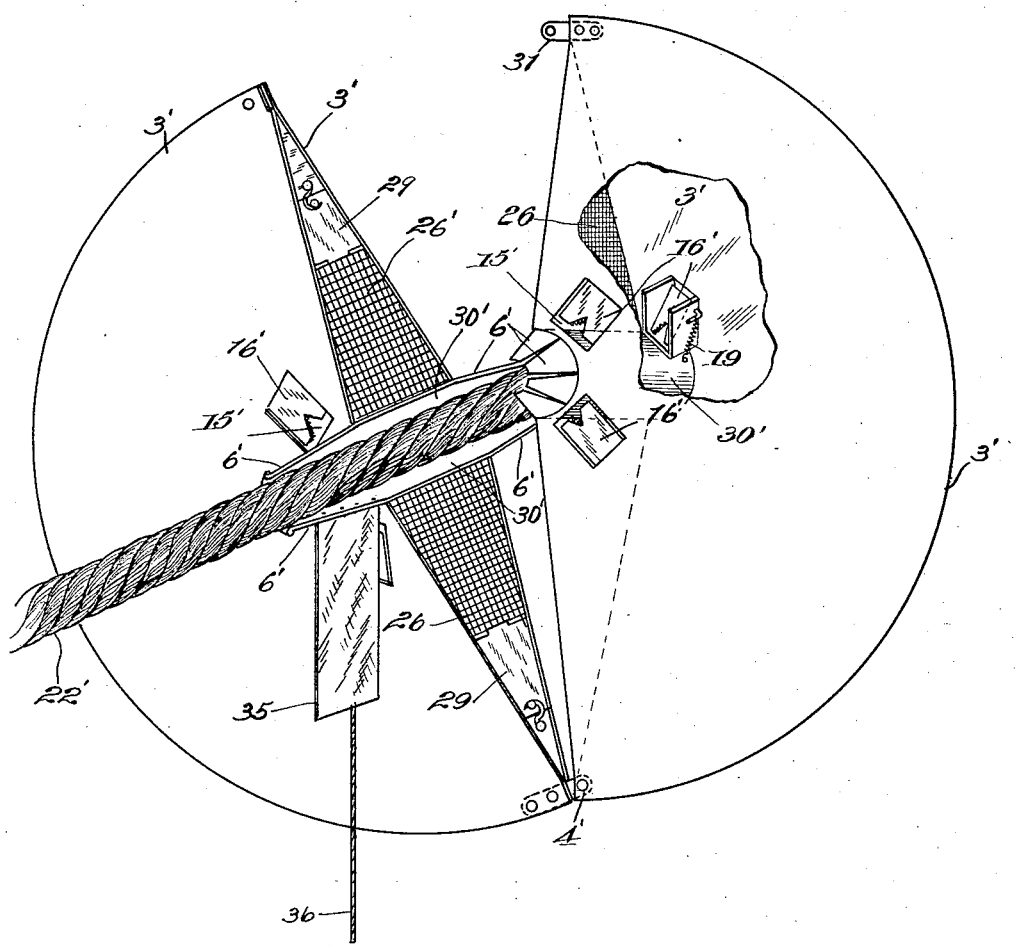

F. E. MAYNARD.
TRAP GUARD.
APPLICATION FILED APR. 7, 1908.
1,060,993.
Patented May 6, 1913.
3 SHEETS—SHEET 1.
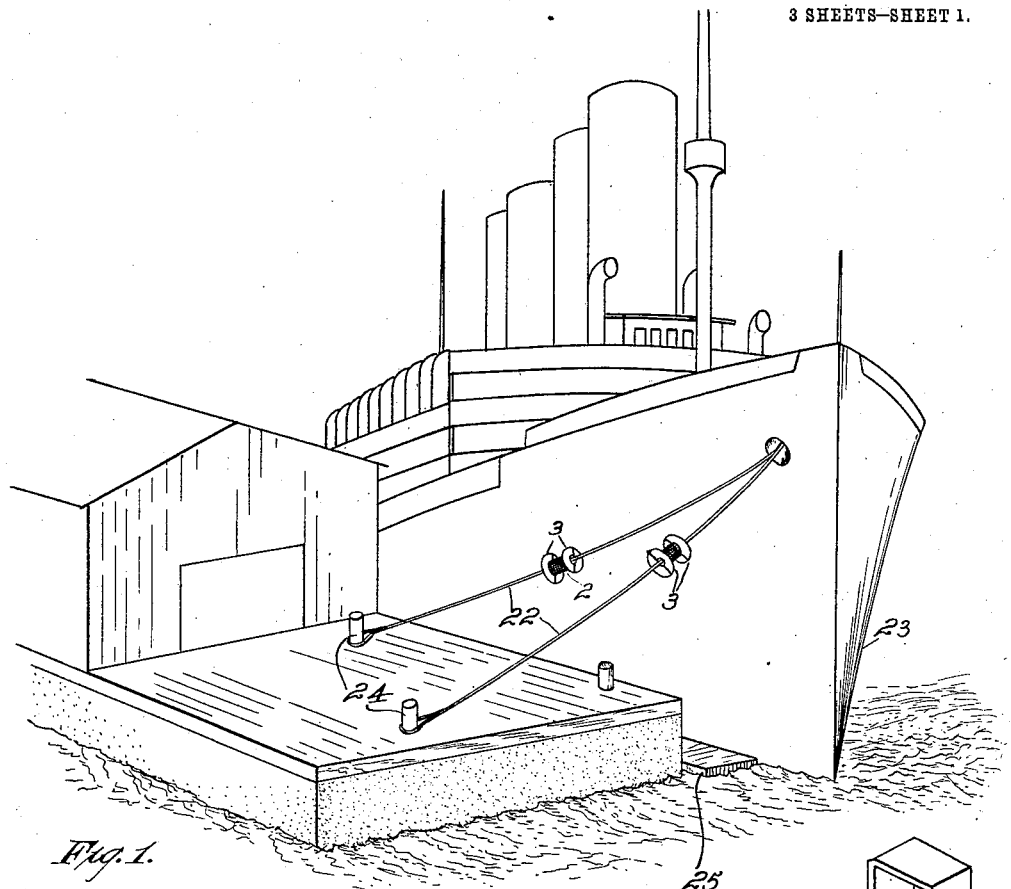
Fig. 1.
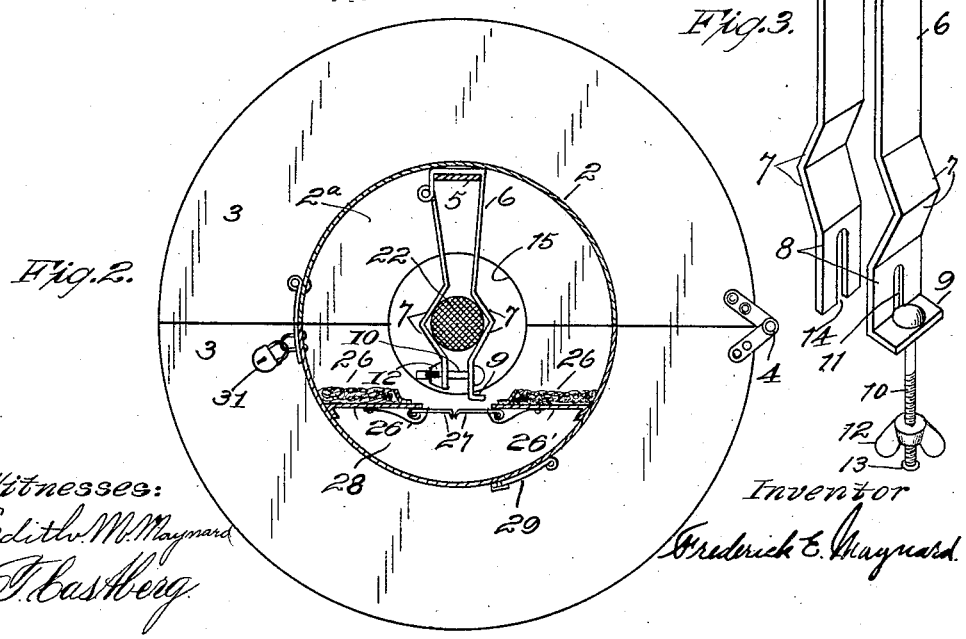
Fig. 2.
Fig. 3.
Witnesses:
Edith M. Maynard
T. Eastberg
Inventor
Frederick E. Maynard

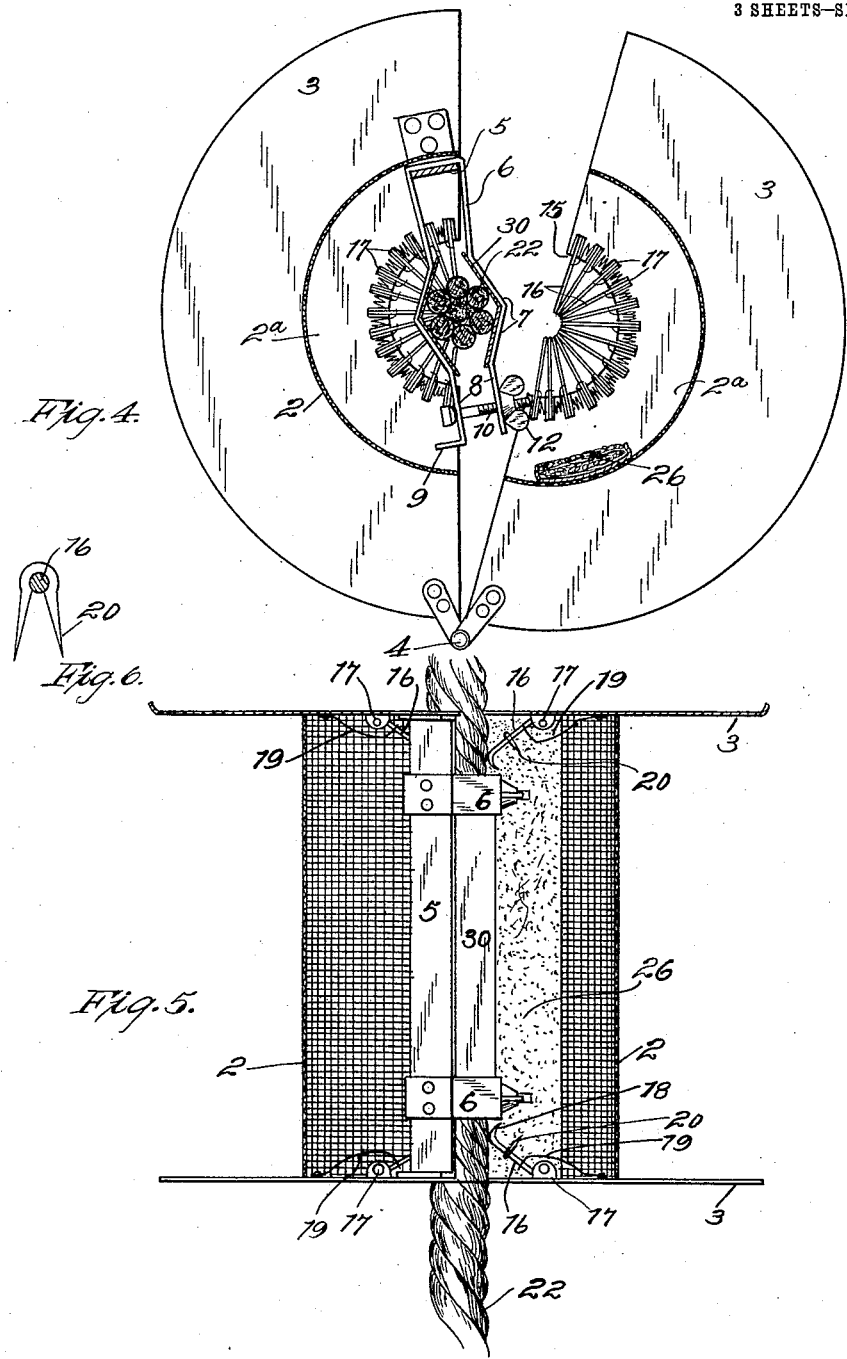

F. E. MAYNARD.
TRAP GUARD.
APPLICATION FILED APR. 7, 1908.

1,060,993.

Patented May 6, 1913.
3 SHEETS—SHEET 3.

WITNESSES:
Edith M. Maynard
T. Eastberg

INVENTOR
Frederick E. Maynard,

UNITED STATES PATENT OFFICE.

FREDERICK E. MAYNARD, OF BERKELEY, CALIFORNIA.

TRAP-GUARD.

1,060,993.  Specification of Letters Patent.  Patented May 6, 1913.

Application filed April 7, 1908. Serial No. 425,775.

*To all whom it may concern:*

Be it known that I, FREDERICK E. MAYNARD, a citizen of the United States, residing at Berkeley, in the county of Alameda and State of California, have invented new and useful Improvements in Trap-Guards, of which the following is a specification.

This invention relates to rat-guards, for vessels and the like, whereby rats are prevented from boarding or leaving ships, when moored.

The objects of my invention are manifold, and will be made clear in the following specification.

Among the important objects may be mentioned: First, providing a device which will prevent the passage of rats, etc., to or from moored vessels. Second, the provision of a device which will entrap migrating rats.

A further object is to provide a combined rat-guard and trap which may be easily and rapidly placed on or removed from a ship's mooring hawser.

Another object is the provision of a trap whose gate members will automatically adjust themselves upon hawsers of various dimensions and irregular circumferences.

Another object is to provide a trap combining means whereby an entrapped animal is smeared with a poisonous material.

Still another object is the provision of a guard-trap embodying supporting members that will automatically adapt themselves to ropes of varying diameters and simultaneously center the rope within the trap and bring the gates into proper juxtaposition to the rope.

It is required by Government health regulations that all vessels engaging in coastwise or foreign trade shall, upon entering port, mount upon their mooring hawsers or cables a suitable rat-guard, and that such vessels be maintained at no less a distance than six feet from the dock or pier. Failure to comply with the regulations will result in a fumigration of the ship before she will be supplied with a clean certificate of health. But even when complying with these regulations, a vessel must be fumigated every thirty days. This results in killing all vermin and other life within a ship. After the fumigation has been completed, all such dead vermin as can be found are removed; but it frequently happens that many of the dead rodents are not found, which in time creates disagreeable and unhealthy conditions.

The present invention has for its object more particularly the provision of a device which will permit access to its interior, both from the shore or mooring toward the ship, and from the ship toward the mooring.

The invention consists of the parts and the construction and combination of parts as hereinafter more fully described and claimed, having reference to the accompanying drawings, in which—

Figure 1 represents the device as applied to a ship. Fig. 2 is a transverse section of the trap with the gates omitted. Fig. 3 is a perspective view of a clamp. Fig. 4 is a transverse section showing trap applied to a cable, and partly open. Fig. 5 is a horizontal section of same. Fig. 6 is a detail showing a modified form of gate. Fig. 7 is a perspective of a modified form of the invention.

Referring to Figs. 1 to 6, inclusive, 2 represents the semi-cylindrical or other suitably shaped body members of approximately equal dimensions, whose ends are closed by disks or any desirable form of head 3. These disks, as here shown, are divided into halves pivoted as at 4, and each head 3 is securely fastened to the end of a respective body member 2. It will thus be apparent that each of the body members 2 being rigidly connected to its respective head 3, is free to be swung open about the pivots 4, and when closed or brought together, the body portion will form a complete cylinder whose ends are closed by the heads 3. These heads are preferably made of sheet-metal, and may be of any suitable diameter; but in actual practice it has been found that a diameter of 30 inches, more or less, is sufficient. The diameter of the body portion 2 may be considerably less.

As shown in Figs. 2—4—5, the heads 3 are rigidly braced by a bar 5 extending from one head to the other head on the same side, and depending from the bar 5 I have shown grip members 6 securely fastened thereon. These grips, as shown in detail in Fig. 3, are directed radially from the center, and are provided, at a point which would approximate the center, with angularly bent jaws 7; and below the jaws 7 the grip is formed with suitably slotted sides 8, one of which is bent outwardly, as at 9, so as to permit a binding screw, as at 10, to be swung downwardly from the opposite side and still be retained in the slot 11. Upon the screw is a thumb-nut 12, which is prevented from working off by upset head or shoulder 13 on the end of the screw. The grippers 6 are made of a suitable material having sufficient resiliency to permit them to be sprung over and around ropes or cables of various diameters to a point between the jaws 7, then upon turning the bolt 10 up into the slot 14 and screwing up the nut 12, the angular jaws 7 will engage and centralize the rope. The heads 3 are provided with a circular opening 15 of sufficient size to surround hawsers, and still have space to permit ready passage of a rat along the rope. These holes or openings open into the interior of the body member 2 and may be closed by a suitable gate construction, and I here show, Figs. 4—5—6, a form comprising gate bars 16 pivoted or mounted, as at 17, in any suitable, equivalent manner. These gate bars 16 are provided at their free ends with inturned, curved points 18, and are acted upon by suitable resilient or flexible members 19. These gate bars 16 are radially mounted upon the heads 3. Thus, when it is desired to remove from, or replace one of these traps on, a cable, each side of the device will swing outward about the pivot 4, carrying with it all of the gate bars 16 mounted upon their respective halves. These gate bars, when in position around a rope, will form a swinging gate, each bar independently movable toward the interior of the trap. Hence it will be seen that a rat will find ready access into the trap by simply pushing inwardly and lifting such gate bars 16 as he may happen to engage; the rounded end of the bar offering but slight resistance to entrance; and the bar will readily re-seat itself upon the circumference of the rope.

The gate bars 16 may be mounted as closely and as numerously as the exigency requires, but I have shown at 20 a suitable pointed or sharpened barb secured to the bar 16, between the pivot 17 and the end 18, for the purpose of preventing any attempt on the part of the entrapped rodent to push the bars apart and escape.

At 26 there is shown a pad or other device which may be saturated or coated with some poisonous material, which the rat, becoming smeared with the same, will lick from his body, or feet, thus becoming poisoned. The semi-cylindrical body members 2 may be made of any suitable material, such as wire-screen, sheet-metal, etc. The pad 26 is made with such area that the entrapped animals must, in their movements, touch and be smeared with the poisoned material. It is well known that rats will not eat poisoned food except when driven to do so by hunger, but they will lick from their skin any adhering substance.

It is now manifest that by my improvement when mounted upon a mooring-hawser, as 22, one end of which is secured to a ship 23, the other end to a mooring or dock 24, between which ship and dock are spacing members 25, rats attempting to board or leave the vessel are not only stopped, but are entrapped, once they raise or pass the pointed gate bars 16; and consequently the number of rats remaining aboard to be killed by fumigation, is reduced.

The interior of the trap is provided in some instance with a false bottom 26' which has at 27 a trap-door or gate through which rats may enter or be driven before the trap is removed from the hawser. The compartment 28 may be emptied of its contents through the door 29.

A very simple, strong, durable and cheap arrangement of parts is shown in Fig. 7. In this form the heads are made cone-shaped, and the adjacent pairs of heads 3' are rigidly secured together at their peripheries, divided diametrically, and pivotally related. The detention chambers formed between the heads 3' are provided with ingress openings 15' and gates 16'. The central portion of the heads 3' surrounds a divided shield 30'; each half of this shield is securely fastened to its contiguous head, and when the heads are swung outwardly upon the pivot 4', the shield sections 30' will be carried therewith, freeing themselves from the hawser.

At 6' I have shown clamps, either made integral with the shield-halves, or in any desirable manner, mounted upon the heads. These clamps are for the purpose of engaging the hawser, and holding the guard thereon, and when made as shown, have sufficient inherent flexibility to adapt themselves to hawsers of various diameters, and will prove an effectual barrier against rodents following the rope. When a rodent has passed through one of the gates 16' he is then within a chamber from which he cannot escape. To remove the guard from the rope, it is only necessary to undo the latch or lock 31, swing open the heads and remove the rats from the chambers through the door 29. Guards actually constructed, incorporating this form of structure, are remarkably strong, and well able to withstand abuse when in use aboard ship.

A feature of considerable importance is the provision of shield 30' embracing the rope passing through the guard-trap to protect it from attack by entrapped rodents.

By reason of the clamps 6' being placed relatively near the heads 3', the heads will always be held in planes at approximately right angles to the hawser, which is very important, for when a ship is moored the hawser has a constantly varying curve, and is sometimes slack, sometimes taut, due to tidal action. Again, the clamps 6' being close to the gates 16', the tendency of the rope to assume a position eccentric to the center of the gate is reduced to a minimum.

It is obvious that the entrapping compartment may be arranged in any suitable and practical manner; the object sought by it is to provide a space to receive the rats when the trap is to be removed from the hawser.

Means are shown, as 35, Fig. 7, for binding the clamping jaws 6' upon the hawser 22' when so desired. This consists of a piece of suitable fabric which may be wrapped and then tied by suitable means, as cord 36.

It is understood that I do not limit myself to the specific mechanical construction shown and described, but may vary the construction within the scope of the claims.

The device is applicable to meat-rails in abattoirs and cold-storage houses, and to the supports of corn-cribs.

Having thus described my invention, what I claim and desire to secure by Letters Patent is—

1. In a guard-trap, the combination of a pair of barrier members inclosing between them a prison chamber, said barriers and prison chamber having a central opening for the passage of a cable, with spring clamping devices proximate the passageway for supporting the device on the cable, said chamber having ingress openings, and means for normally preventing egress through said openings.

2. A rat guard comprising suitable barriers, clamps for mounting said barriers upon a support, and means by which said clamps are made to snugly inclose the support.

3. A guard-trap comprising a pair of conical disks centrally perforated to pass a cable, said disks coöperating to inclose an entrapping chamber, said chamber having ingress passages.

4. An animal trap for hawsers comprising end disks with a cage chamber between the disks, and said chamber having normally closed ingress openings proximate to the hawser, and means for mounting the trap upon hawsers of various diameters.

5. A trap embodying suitable barriers disposed to inclose a prison chamber, means for mounting the trap upon a support, and automatically closable gates opening inwardly in said barrier members to permit ingress from either side of the trap.

6. A rat-guard, adapted to embrace a support, comprising barriers forming a chamber and arranged to prevent travel along said support irrespective of its position, and means by which ingress may be had into the chamber from either direction and to prevent egress from the chamber.

7. A rat-guard for ships, or the like, consisting of a cage; the walls of which form barriers and having openings permitting ingress; inwardly opening, entrapping devices for the openings, and means for removably securing the cage upon a hawser.

8. A rat-guard comprising a pair of conical disks rigidly secured base to base and perforated to receive a cable, said disks being centrally divided and pivotally related, and clamp members connected to the disks.

9. An animal trap comprising a cage having oppositely disposed openings in the walls thereof, means secured to said cage for clasping a hawser or other support, automatic entrapping closures for said openings, and means whereby the entrapped animals may be released from the cage.

10. A rat-guard adapted to be mounted upon a suitable support, comprising clamp members, a cage carried by said members having openings permitting entrance from either direction along said support, and automatic entrapping closures for the openings.

11. A rat-guard comprising a cage, clamp members adapted to embrace hawsers of various diameters, carried by said cage, the cage having ingresses proximate to the hawser and automatic entrapping gates for said ingresses.

12. A trap comprising a cage, members for securing said cage upon supports of various sizes; the walls of the cage having openings permitting ingress from either direction along the support, and automatic entrapping closures for said openings operable irrespective of the position of the support.

13. An animal trap adapted to encompass a hawser, consisting of barrier members inclosing a prison chamber having passages provided with automatically closing gates to permit ingress from either side of said trap; and means for protecting the hawser from attack by entrapped animals.

14. An animal barrier adapted to encompass a support having a chamber to which access may be had from either side of the barrier, means on the barrier automatically effective to prevent the return of animals from said chamber, and adjustable instrumentalities whereby the barrier is sustained while encompassing a support.

15. A trap for the purpose specified, comprising a rat or mouse proof receptacle mounted between a pair of spaced end members, said members forming the end closures of the receptacle, each member being formed of two parts hinged together, one of said members being provided with an opening, and a trap door for said opening.

In testimony whereof I have hereunto set my hand in presence of two subscribing witnesses.

FREDERICK E. MAYNARD.

Witnesses:
CHARLES EDELMAN,
CHARLES A. PENFIELD.

Copies of this patent may be obtained for five cents each, by addressing the "Commissioner of Patents, Washington, D. C."